United States Patent [19]

Pecoraro et al.

[11] 4,040,809

[45] Aug. 9, 1977

[54] GLAZED REFRACTORY SUPPORT FOR DELIVERING GLASS TO A FORMING CHAMBER

[75] Inventors: George A. Pecoraro, Lower Burrell; Richard L. Bayne, New Kensington, both of Pa.

[73] Assignee: PPG Industries, Inc., Pittsburgh, Pa.

[21] Appl. No.: 670,597

[22] Filed: Mar. 26, 1976

[51] Int. Cl.² .............................................. C03B 18/02
[52] U.S. Cl. ................................... 65/182 R; 65/32; 65/374 R
[58] Field of Search .................. 65/32, 182 R, 374 M, 65/374 RM, 374 R

[56] References Cited

U.S. PATENT DOCUMENTS

| | | | |
|---|---|---|---|
| 710,357 | 9/1902 | Heal | 65/182 R |
| 789,911 | 5/1905 | Hitchcock | 65/182 R |
| 3,083,551 | 4/1963 | Pilkington | 65/32 |
| 3,123,458 | 3/1964 | Swift et al. | 65/374 RM X |
| 3,655,356 | 4/1972 | Javaux | 65/356 X |
| 3,843,346 | 10/1974 | Edge et al. | 65/99 A |
| 3,854,922 | 12/1974 | Sensi et al. | 65/182 R |
| 3,884,665 | 5/1975 | Edge et al. | 65/99 A |
| 3,898,069 | 8/1975 | Cerutti et al. | 65/182 R |

*Primary Examiner*—Arthur D. Kellogg
*Attorney, Agent, or Firm*—E. Kears Pollock

[57] ABSTRACT

A flat glassmaking facility having a refractory threshold or other refractory support for delivering molten glass from a refiner or conditioner of a glass furnace to a bath or pool of molten metal in a flat glass forming chamber is provided with a refractory threshold or support having a superficial layer or glaze of differing refractory composition than the threshold or support composition on at least a portion of the surfaces of the refractory threshold or support in order to substantially inhibit the passage of gases through the refractory threshold or support.

10 Claims, 1 Drawing Figure

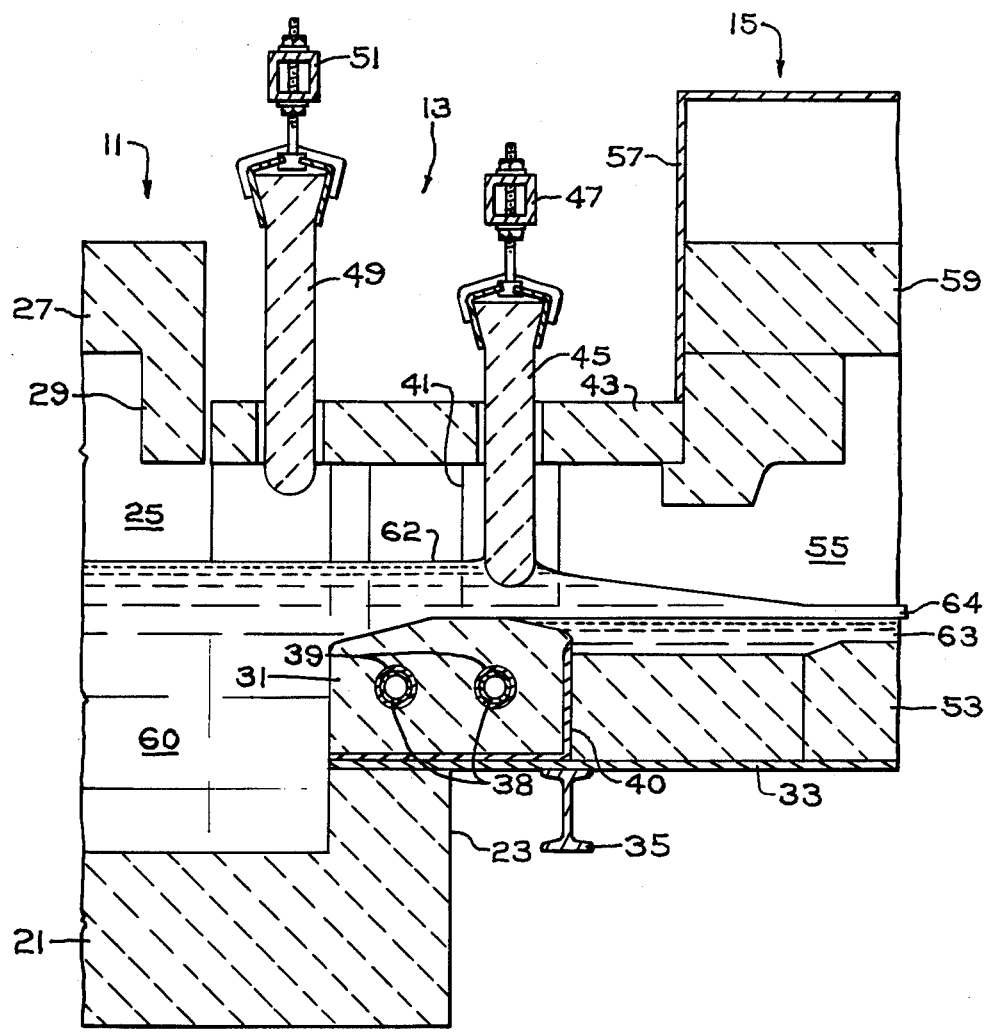

GLAZED REFRACTORY SUPPORT FOR DELIVERING GLASS TO A FORMING CHAMBER

BACKGROUND OF THE INVENTION

1. Field of the Invention

The present invention relates to an apparatus for manufacturing flat glass wherein the glass is formed while being supported on a surface of a pool of molten metal following delivery of the glass onto the molten metal over a threshold or other refractory support from a glassmaking furnace. More particularly, this invention relates to a threshold or canal of a molten glass delivery facility for supporting molten glass during its delivery onto the pool of molten metal.

2. Brief Description of the Prior Art

It is known that molten glass can be delivered onto molten metal and formed into a continuous ribbon or sheet of glass according to the teachings of Heal, U.S. Pat. No. 710,357; of Hitchcock, U.S. Pat. No. 789,911; of Pilkington, U.S. Pat. No. 3,083,551 and of Edge and Kunkle, U.S. Pat. No. 3,843,346. In all of the prior art, molten glass is delivered over some rigid element usually a refractory member onto molten metal. In the practice disclosed by Pilkington, the molten glass is delivered through a long, narrow canal and over a lip from which molten glass falls freely onto molten metal and spreads outwardly upon it to form a body of floating glass which is advanced along the molten metal to form a continuous ribbon of glass.

In the patents of Heal, Hitchcock and Edge and Kunkle, molten glass is delivered over a refractory support along a substantially horizontal path, that is, it is not permitted to fall freely. The path taken by the glass may be either a perfectly horizontal path or a downwardly sloping path. After delivery, the glass advances as a wide stream of molten glass onto and along the molten metal. In the method and apparatus of Edge and Kunkle, a refractory threshold is provided over which molten glass is delivered as described in U.S. Pat. No. 3,884,665. The refractory threshold is preferably an element having an upwardly facing convex surface for supporting molten glass during its delivery from the glassmaking furnace to the glass forming chamber. In general, the threshold acts as a dividing member or wall member between the glassmaking furnace and the forming chamber in addition to being a support for the molten glass during delivery.

Several recent patents describe particular thresholds and their arrangements with respect to glassmaking furnaces and associated glass forming chambers as used in the apparatus generally taught by Edge and Kunkle in U.S. Pat. No. 3,843,346. These include U.S. Pat. No. 3,854,922 to Sensi and Wehner; U.S. Pat. No. 3,898,069 to Cerutti and Gulotta and U.S. application Ser. No. 549,214 to Cerutti and Gulotta now U.S. Pat. No. 3,986,857.

With particular reference to U.S. Pat. No. 3,898,069 to Cerutti and Gulotta, it is appreciated tht a threshold may be mounted at least partially within an impervious metal casing housing a forming chamber and that a refractory threshold may be mounted adjacent to a refractory liner within such a casing so that the threshold may form a part of the container for containing a pool of molten metal, such as tin, within the forming chamber.

The present applicant has devised an improved threshold or other glass support whereby the risk of transpiration of gases from outside a forming chamber into it through the threshold may be reduced or eliminated.

SUMMARY OF THE INVENTION

A threshold for use in combination with a glass forming chamber is provided. The threshold comprises a refractory having an upper glasscontacting supporting surface or surfaces, and it is mounted at least partially within a bottom portion of an impervious casing or within an extension casing for the lower part of the glass forming chamber. The threshold may comprise one refractory piece or a plurality of refractory pieces joined together. The threshold has a substantially impervious refractory layer disposed about and affixed to at least a portion of the threshold's surfaces. This substantially impervious refractory layer has a composition which differs from the composition of the main body of the refractory threshold. The surfaces of the threshold to which the impervious refractory layer is affixed are those surfaces which are remote from the threshold's glass-contacting and supporting surfaces. In general, therefore, the surfaces to which the impervious refractory layer is affixed are the bottom of the threshold and the front face of the threshold which is that face of the threshold facing away from the glassmaking furnace and toward the refractory liner or toward the molten metal within the glass forming chamber.

The layer of impervious refractory affixed to selected surfaces of the threshold may be a distinctly separate layer from the threshold itself or may be formed by a refractory species impregnated into the threshold refractory so that a distinct line of demarcation between the threshold refractory and the surface refractory is not provided. In this second embodiment there is a diffusion of constituents between the layer of the impervious refractory and the refractory constituting the main body of the threshold. The impervious refractory layer is preferably of a composition which differs from the main body of the threshold such that the impervious layer of refractory is in compression at the temperatures at which the threshold is maintained during use. In this way crazing or cracking of the superficial layer of impervious refractory is avoided.

In the instance of a threshold which is provided with holes or openings extending through it, such as openings for receiving thermal control elements, for example, heaters or coolers, the threshold further includes a substantially impervious refractory layer of the different composition disposed on and affixed to h surfaces of these openings extending through the threshold.

In a preferred embodiment of the invention wherein the refractory threshold is substantially silica, for example, fused silica as described in U.S. Pat. Nos. 3,843,346 and 3,884,665 to Edge and Kunkle, the impervious refractory layer is conveniently one substantially comprising boric oxide. Such a boric oxide refractory layer may be prepared on a selected surface of a silica refractory threshold by applying an aqueous boric oxide solution to those surfaces which are to be provided with an impervious layer and then heating those surfaces by placing the threshold in a furnace or by employing an oxyacetylene torch. When using a torch, the flame of the torch is directed against the refractory surface so that the surface that has been treated with boric oxide is heated to a temperature of at least about 1800° F. (980° C.) and held at that temperature for at least about 30 minutes. In particular, heating to a temperature of 1850°

F. (1010° C.) for about 1 hour yields an impervious layer at the selected surfaces which have been treated, which layer exhibits no crazing or cracking indicating that the layer is in compression. Of course, as indicated in the previously mentioned patent of Edge and Kunkle, the threshold may comprise a refractory material other than silica, for example, the threshold may be molybdenum or may substantially comprise alumina, such as a 95 percent alumina refractory. When these materials are employed as refractory threshold materials, their selected surfaces may be rendered impervious by applying a cement or glassy frit to their surfaces and thereafter firing them. A threshold made of an alumina refractory (more than 90 percent alumina for example) may be fabricated by cutting it to the desired shape and then applying a high alumina cement to the face of the refractory which faces away from glass during use. The cement may be fired or cured in place after installation during initial heating of the delivery facility in which it is installed.

While the description already set forth concerns a glass delivery facility wherein the glass support is a refractory threshold, this invention is also applicable to a refractory canal as commonly employed in the practice of the Pilkington method of delivering molten glass to a metal bath for forming. In such a facility the outwardly facing surfaces of the canal bottom and side wall refractories may be glazed in the manner already described. Thus, in a broad sense this invention contemplates providing the outer surfaces of refractories which are contacted by molten glass during its delivery for forming with a dissimilar refractory skin, layer or surface glaze to seal the refractories. The "outer" surfaces are those surfaces of the refractories which are not themselves contacted by the molten glass. The dissimilar refractory skin or layer is preferably a refractory composition having a greater coefficient of thermal expansion than that of the base refractory support member or threshold so that the dissimilar refractory skin or layer will be in compression at high operating temperatures.

The preferred embodiment of this invention may be more fully understood from a description of the drawing which follows.

BRIEF DESCRIPTION OF THE DRAWING

The accompanying FIGURE is a partial sectional longitudinal elevation of a glass making furnace connected through a molten glass delivery facility to a glass forming chamber.

DETAILED DESCRIPTION OF THE PREFERRED EMBODIMENTS

Referring now to the accompany drawing, there is shown the discharge or exit end of a glass tank or furnace 11 connected through a glass delivery facility 13 to a glass forming chamber 15 at its inlet or entrance end. The glass furnace 11 includes a melter (not shown) and a refiner or conditioner, the exit end of which is shown. At its exit end, the furnace 11 comprises, in part, a refractory bottom 21, a front basin wall 23, side walls 25, a roof or crown 27 and an upper front wall 29.

The delivery facility 13 includes a threshold 31 resting on a bottom casing 33 which is, in turn, set on a structural support 35. The threshold 31, preferably includes transverse openings extending through it with coolers 38 disposed in those holes. The inside faces of the holes are provided with an impervious refractory layer 39 which has a composition differing from that of the threshold 31. The threshold is also provided with an impervious refractory layer 40 on its bottom and front faces, as shown, and on its end surfaces at either side of the delivery facility.

The delivery facility also includes side members or jambs 41 extending upwardly at each end of the threshold 31 to define the sides of the delivery facility. These jambs 41 are preferably provided with an impervious refractory layer on their outer faces which face away from each other and from the interior of the facility.

The delivery facility further includes a roof or flat arch 43 and metering members 45 and 49 with their respective lifting and manipulating mechanisms 47 and 51. Although a primary benefit of this invention is associated with preventing the ingress of outside gases into the chamber 15 and delivery facility 13 beneath the glass therein to prevent its entrapment in the glass and its consequent conveyance into contact with the molten metal of the forming chamber, it is also beneficial to prevent the ingress of gases above the glass. Therefore, this invention also contemplates the application of a glaze or dissimilar refractory layer to the surfaces of the metering members or tweels, particularly to the surfaces of the control tweel 45.

The forming chamber includes, in part, the casing 33 which extends under the chamber, upwardly along its sides and exit end (not shown) and into a sealed jointure with an upper casing 57. Disposed within the lower or bottom casing 33 is a refractory bottom liner 53. Refractory liner side walls 55 are also provided. An upper casing 57 extends over and about the upper portion of the chamber including the upper portion of the side walls 55 within it. A refractory roof 59 extends over the interior of the chamber and it is spaced sufficiently above the bottom liner to provide a headspace above a pool of molten metal 63, such as tin, contained therein.

The glass furnace 11 contains a pool of molten glass 60 which is maintained in a molten state from the heat supplied for continuously melting batch to make glass. A stream of molten glass 62 is withdrawn from the pool of glass 60 over the threshold 31 and is discharged as an advancing stream or body of glass 64 onto the pool of molten metal 63 in the forming chamber. As the glass advances along the molten metal it is cooled and sufficient tractive forces are applied to it to form a dimensionally stable, continuous sheet of glass from it. This continuous sheet of glass is then removed as formed from the chamber 15 and annealed or otherwise further treated to make useful articles such as automotive or architectural windows.

During operation the headspace of the forming chamber is provided with an atmosphere which is a reducing atmosphere. For example, a mixture of hydrogen and nitrogen may be provided as the reducing atmosphere. In any event, the gaseous mixture inside the forming chamber will differ greatly from the outside or ambient atmosphere outside the chamber. Further, there will be established, by virtue of the heat in the glass being formed, a large temperature differential, on the order of at least 1000° F., between the inside faces of the threshold which are contacted by molten glass and its outside faces which are facing the casing 33. Both of these factors tend to enhance the migration of unwanted gaseous species, such as oxygen, from the outside environment through the threshold and into the glass. By providing the threshold 31 and its assembly including the jambs 41 with a superficial impervious refractory layer on the outer faces of these refractory members, the ingress of undesired gaseous species is essentialy halted.

Fused cast silica having a fired surface has a high diffusivity of greater than 80 centimeters. Fused cast silica with a glaze on its surface made by contacting it with boric oxide and held for one hour at 1850° F. (1010° C.) has a diffusivity of only 1.2 centimeters. By firing the same material using an oxyacetylene torch, the glazed silica has a diffusivity of only 0.8 centimeter. Addition of a refractory layer to fused cast silica which is made by applying a zircon cement (with either a water or waterglass binder) and heating to 1250° F. (675° C.) for 40 minutes or using a waterglass binder and firing with an oxyacetylene torch results in combinations having diffusivities of about 2.8 centimeters. As seen from this diffusivity data, the present invention will provide for substantial reduction in the ingress of gases into a glass forming chamber by diffusion or trnaspiration.

While this invention has been described with reference to particularly desirable embodiments of it, the scope of the invention is not to be construed as limited only to those preferred embodiments. Variations and modifications from those embodiments may be made without departing from the spirit of this invention as defined by the following claims.

We claim:

1. In an apparatus for making flat glass comprising a glass furnace connected to a forming chamber through a molten glass delivery facility wherein the forming chamber includes an impervious metal casing having an inner refractory liner containing a pool of molten metal for supporting glass during forming and the delivery facility includes a refractory support for supporting molten glass during its delivery to the forming chamber, the refractory support having glass contacting surfaces and outer surfaces, the improvement which comprises
 a substantially impervious, glazed, refractory layer of differing composition from that of the refractory support disposed on and affixed by fusing to a sufficient portion of the outer surfaces of the refractory support to effectively diminish the diffusivity of the refractory support.

2. The apparatus according to claim 1 wherein the refractory support is a threshold mounted at least partially inside the impervious metal casing of the forming chamber and wherein the substantially impervious refractory layer of differing composition is disposed on and affixed to the bottom surface and a lower portion of a front face of the threshold, which front face is that surface facing the forming chamber.

3. The apparatus according to claim 1 wherein the refractory support is substantially silica and the substantially impervious refractory layer comprises boric oxide.

4. The apparatus according to claim 3 wherein the substantially impervious refractory layer is one prepared by coating the surface of the silica refractory support with a boric oxide solution and then heating the coated support to a temperature of at least about 1800° F. (980° C.) and held above that temperature for at least 30 minutes.

5. The apparatus according to claim 3 wherein the substantially impervious refractory layer is one prepared by coating the surface of the silica refractory support with a boric oxide solution and then heating the coated support by directing an oxyactylene flame against its coated surface for a sufficient time to fuse it.

6. The apparatus according to claim 1 wherein the impervious refractory layer is in compression at temperatures of use.

7. The apparatus according to claim 1 wherein the refractory support has at least one hole extending through it and the surfaces of the support within the hole are provided with an impervious refractory layer as provided on the outer surfaces thereof.

8. The apparatus according to claim 1 wherein the delivery facility further includes refractory side members extending upwardly from the ends of the refractory support, the side members having inner, glass contacting surfaces and outer surfaces and wherein the improvement further comprises a substantially impervious refractory layer of differing composition from that of the side members disposed on and affixed to sufficient portions of their outer surfaces to effectively diminish the diffusivity of the side members.

9. The apparatus according to claim 8 wherein the refractory support is a threshold and the side members are jambs, all made of fused cast silica and wherein each of their outer surfaces is provided with a layer of boric oxide.

10. The apparatus according to claim 9 wherein the layers of boric oxide are ones prepared by coating the respective silica refractory surfaces the boric oxide solution and then directing an oxyacetylene flame against the coated surfaces for a sufficient time to fuse them.

* * * * *

UNITED STATES PATENT AND TRADEMARK OFFICE
CERTIFICATE OF CORRECTION

PATENT NO. : 4,040,809
DATED : August 9, 1977
INVENTOR(S) : George A. Pecoraro and Richard L. Bayne It is certified that error appears in the above-identified patent and that said Letters Patent are hereby corrected as shown below:

Column 6, line 45, "the" should be --with--.

*Signed and Sealed this*

*Twentieth* Day of *December 1977*

[SEAL]

Attest:

RUTH C. MASON
*Attesting Officer*

LUTRELLE F. PARKER
*Acting Commissioner of Patents and Trademarks*